(12) United States Patent
Ichiyoshi (10) Patent No.: US 7,155,160 B2
(45) Date of Patent: Dec. 26, 2006

(54) SATELLITE COMMUNICATIONS DATA DISTRIBUTION SYSTEM CAPABLE OF PROVIDING A LOT OF DATA IN RESPONSE TO A USER'S REQUEST

(75) Inventor: Osamu Ichiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 335 days.

(21) Appl. No.: 09/835,518

(22) Filed: Apr. 17, 2001

(65) Prior Publication Data

US 2001/0031620 A1   Oct. 18, 2001

(30) Foreign Application Priority Data

Apr. 18, 2000   (JP)   .............. 2000-116389

(51) Int. Cl.
*H04H 1/00*   (2006.01)

(52) U.S. Cl. ................. 455/3.02; 455/3.03; 455/414.2; 455/427

(58) Field of Classification Search ............. 455/3.02, 455/3.1, 427, 12.1, 4.1, 4.2, 3.03, 3, 414, 455/414.2, 3.04; 395/200.47; 709/203
See application file for complete search history.

(56) References Cited

U.S. PATENT DOCUMENTS

| | | | | |
|---|---|---|---|---|
| 5,329,590 | A * | 7/1994 | Pond ...................... 380/242 |
| 5,701,580 | A * | 12/1997 | Yamane et al. ............ 455/3.01 |
| 5,887,257 | A * | 3/1999 | Olds ...................... 455/427 |
| 5,920,701 | A * | 7/1999 | Miller et al. ............. 709/228 |
| 5,970,386 | A * | 10/1999 | Williams .................. 725/69 |
| 5,987,233 | A * | 11/1999 | Humphrey ................. 709/217 |
| 6,070,065 | A * | 5/2000 | Armbruster et al. ........ 455/404.2 |
| 6,130,898 | A * | 10/2000 | Kostreski et al. .......... 370/522 |
| 6,249,676 | B1 * | 6/2001 | Alperovich et al. ........ 455/427 |
| 6,366,761 | B1 * | 4/2002 | Montpetit ................ 455/12.1 |
| 6,741,841 | B1 * | 5/2004 | Mitchell ................. 455/188.1 |
| 2001/0000194 | A1 * | 4/2001 | Sequeira .................. 725/39 |
| 2001/0023429 | A1 * | 9/2001 | Barker et al. ............ 709/203 |
| 2003/0058817 | A1 * | 3/2003 | Asai ...................... 370/331 |

(Continued)

FOREIGN PATENT DOCUMENTS

JP   48-11904   2/1973

(Continued)

OTHER PUBLICATIONS

Okada, S.; Naito, S. Eda, T.; "System Applied to Satellite Communication Service Direct PC"; Fujits Mar. 10, 1997; vol. 48, No. 2, p. 98-105.

(Continued)

*Primary Examiner*—Matthew D. Anderson
*Assistant Examiner*—Tan Trinh
(74) *Attorney, Agent, or Firm*—McGinn IP Law Group, PLLC (57) ABSTRACT

Connected to a satellite earth station for transmitting a broadcast signal to a communication satellite, a data (distribution) center publishes contents of stored information on a home page (HP) of the Internet to submit retrieval of users. When each user determines date to be gotten by retrieving on HP, the user transmits a request signal to the date center via a ground Internet or the communication satellite. Responsive to the request signal, the date center returns a reservation signal including a group address and a distribution scheduled time instant to a request source via the communication satellite. A user's terminal receives date with the group address at a reserved time instant, deciphers the date using a key given from the date center separately, and stores deciphered date in a memory thereof.

18 Claims, 9 Drawing Sheets

U.S. PATENT DOCUMENTS

2003/0117430 A1* 6/2003 Reynolds et al. ............ 345/721
2004/0030768 A1* 2/2004 Krishnamoorthy et al. . 709/223

FOREIGN PATENT DOCUMENTS

| JP | 60-39986 | | 3/1985 |
|---|---|---|---|
| JP | 4-502990 | | 5/1992 |
| JP | 5-41684 | | 2/1993 |
| JP | 05-041684 | * | 2/1993 |
| JP | 5-501942 | | 4/1993 |
| JP | 6-141004 | | 5/1994 |
| JP | 6-326983 | | 11/1994 |
| JP | 7-111648 | | 4/1995 |
| JP | 08-213961 | * | 8/1996 |
| JP | 8-213961 | | 8/1996 |
| JP | 9-51298 | | 2/1997 |
| JP | 9-98163 | | 4/1997 |
| JP | 10-108161 | | 4/1998 |
| JP | 10-127947 | | 5/1998 |
| JP | 2000-36781 | | 2/2000 |

OTHER PUBLICATIONS

Japanese Office Aciton dated Mar. 12, 2003 with Partial English Translation.
Japanese Office Action dated Dec. 11, 2002 with Partial English Translation.
Okada, S.; Naito, S. Eda, T.; "System Applied to Satellite Communication Service Direct PC"; Fujits Mar. 10, 1997; vol. 48, No. 2, p. 98-105.
Fujikawa; Yoshino: Internet Progression using Satellites; Nikkei Communication; Nikkei BP.; Sep. 01, 1997; No. 253; p. 92-113.
Fune, S.; Down path of internet construction (16) is the Ultrasonic speed satellite internet; Nikkei communications; Nikkei Communication; Nikkei BP Co.; Nov. 17, 1997; No. 253; p. 92-113.
Fujikawa; Yoshino: Internet Progression using Satellites; Nikkei Communication; Nikkei BP.; Sep. 01, 1997; No. 253; p. 92-113.
Fune, S.; Down path of internet construction (16) is the Ultrasonic speed satellite internet; Nikkei communications; Nikkei Communication; Nikkei BP Co.; Nov. 17, 1997; No. 253; p. 92-113.

* cited by examiner

SATELLITE COMMUNICATIONS DATA DISTRIBUTION SYSTEM CAPABLE OF PROVIDING A LOT OF DATA IN RESPONSE TO A USER'S REQUEST

BACKGROUND OF THE INVENTION

This invention relates to a satellite communication system for effectively carrying out data distribution using a wide-area characteristic, a broadcasting characteristic, and a broad-band characteristic in satellite communications.

In recent years, drastic growth has been observed in a system for carrying out data distribution using the Internet. Not only distribution of music or news, but also Internet schools or colleges for providing students with home education has been popular.

In the manner which will later be described in conjunction with FIG. 1, a conventional data distribution system comprises a plurality of members or subscribers, a plurality of data makers, the Internet serving as a ground communication network connected to the members and the data makers, and a data distribution center connected to the Internet. The data distribution center provides a home page (HP).

In addition, similar data distribution systems or broadcasting colleges using satellite communications are also widely used. For example, a Perfect PC is implemented as such a data distribution system using the satellite communications.

Whether the conventional data distribution system is the data distribution system using the Internet or the data distribution system using the satellite communications, the conventional data distribution system instantly distributes data in response to a data request signal from any user.

With the enlargement of a business's area using the Internet, an amount of data transmitted drastically increases. Under the circumstances, large problems have been presented in the above-mentioned data distribution system as follows.

A first problem is that there is a right restriction in quantity for provided data.

For example, although the data distribution system using the satellite communications usually uses a bandwidth of several megahelts (MHz), a data communication capacity per person degrades justly when calls are congested.

On the other hand, inasmuch as the data distribution system using the Internet of the ground communication network transmits a signal having a packet format via a lot of routers, a communication capacity per call degrades in the similar manner when calls are congested. In particularly, packet communications have a bad efficiency and take much time in order to transmit a lot of data.

A second problem is that communications are expensive. This is because the satellite communications are expensive naturally. In addition, inasmuch as the Internet transmits a signal via a number of routers, to transmit a lot of data takes data.

More specifically, the Internet originally is a system for connecting two points with a packet communication system and therefor a communication cost per subscriber is not degraded although the number of subscribers increases. For instance, description will be exemplified in a case of education as follows. It will be assumed that an amount of data is 10 megabytes (MByte) required to a lecture for one hour. If data is read out at a channel speed of 50 Kb/s, time of 1600 seconds or thirty minuets takes. A communication cost therefore reaches a large amount and about one hour takes for reading teaching materials if the subscriber takes two subjects for one day. In addition, when the number of the subjects increases, time and cost takes for distributing the teaching materials and it results in difficulty in realizing the business.

A third problem is that it is difficult to communicate in an interactive mode of a momentary fashion. This is because, in the manner which is described above, the Internet has a characteristic where data is always stored in a home page acting as a center and any user reads the data out of the home page via a communication line in necessary. In order to carrying out a seminar at the interactive mode of the momentary fashion, it is necessary to establish a telephone line between the subscriber or a receiver and the data maker or a sender and it is difficult to carry out this when the number of participants increases.

SUMMARY OF THE INVENTION

It is therefore an object of this invention to provide a satellite communication data distribution system which is capable of providing a extremely number of users with a lot of data at low cost in a form corresponding to a request.

Other objects of this invention will become clear as the description proceeds.

The present inventor repeatedly studied as regards the reason why the above-mentioned problems occur in each of the conventional data distribution systems. In the manner which is described above, each of the conventional data distribution systems is the so-called instant getting system which instantly distributes data in response to a data request signal from a user. For example, in a case where the user orders an electronic book or books, it is possible in the user to instantly get a desired electronic book or books. However, in the manner which is described above, the instant getting system is disadvantageous in that it takes a long time to get the electronic book if a circuit is congested and it is expensive because the user must pay a communication fee alone.

Accordingly, in a case, for example, where a user orders an electronic book or books, the present inventor reached to an idea that the above-mentioned problems are resolved if there are not only a choice so as to enable to instantly get the electronic book or books but also another choice so as to enable to order the electronic book or books by designating or setting a term such as one day, one week, or the like or with a time limit. That is, if any user can order any electronic book with the time limit, a desired electronic book may be simultaneously distributed to a plurality of users via a satellite at it's designated time instant in a case where other users already ordered the same electronic book. As a result, a communication fee per person is not expensive. In the manner which is described above, this invention effectively uses a satellite channel in a subscription fashion. Inasmuch as satellite communications cover an enlarged area, it may be expected that almost books may be ordered by a number of users for one day or one week. In such a case, this invention is extremely effective.

More specifically, according to an aspect of this invention, a data distribution system comprises a communication satellite, a plurality of satellite communication terminals for enabling to receive a signal from the communication satellite, a satellite earth station for carrying out a principal communication via the communication satellite, a data distribution center connected to the satellite earth station via a communication channel, and a data communication network for connecting the data distribution center with a database in order to collecting information. The data distribution center includes an electronic library for storing collected information in an electronic fashion and for presenting its contents to users of the satellite communication terminals for retrieval. Responsive to a data request signal from a user, the electronic library provides required information. Each satellite communication terminal comprises an arrangement for transmitting the data request signal with a time limit to the data distribution center. Responsive to the data request signal with the time limit from each satellite communication terminal, the data distribution center comprises an arrangement for distributing desired data to a plurality of satellite communication terminals via the satellite earth station and the communication satellite within a designated term.

In addition, the above-mentioned data distribution system may further comprise a ground communication network for connecting the data distribution center and each satellite communication terminal. In addition. the above-mentioned data communication network may be the Internet.

DESCRIPTION OF THE PREFERRED EMBODIMENTS (Operations of the Invention)

Description will at first be directed to operations of this invention to facilitate an understanding of this invention.

(1) Merits of Satellite Communications

Satellite communications can provide a communication network at once at an enlarged area of about one third of an earth's surface by using one satellite. Merits of the satellite communications in a going or outgoing communication are broadcast as well as wide-area or global. The satellite communications are specifically suitable for broadcasting and are presently commercialized as a direct satellite broadcasting.

In recent years, inasmuch as a communication satellite is loaded with an antenna having a large caliber or diameter and has a drastic increased output power, a large-capacity communication is available. Simultaneously, the communication satellite has a particularly improved reception sensitivity and communication at a fair high-speed is available in a returning or incoming communication where a small satellite communication terminal for a subscriber transmits. Accordingly, broadband as well as the wide-area and the broadcast are strengthened as the merits of the satellite communications and the satellite communications have a drastic improved performance as a communication network.

(2) Problems in the Internet

In recent years, radical growth in the Internet and in business putting the Internet to practical use are really remarkable. In company with this, demerits in the Internet now in use has been also obvious. A large problem in the Internet is that a channel capacity is small. With connection using a telephone channel, the channel capacity is about 50 kbps at most. In a case of using an integrated services digital network (ISDN), the channel capacity is about 100 kbps to the utmost. In order to raise a data rate of an access channel, various methods have been developed and the channel capacity of about 1 Mbps has been presently available by using new techniques such as an asymmetric digital subscriber line (ADSL) or the like. However, although the data rate of the access channel is raised, a date rate in a wide-area communication network or backbone becomes an issue. More specifically, the Internet is that connects between two points in all the world via several routers and connection to a point where a lot of calls concentrate take too a long time in an especially case of a large amount of data and then unpractical events occur frequently.

(3) Solution Using a Satellite

As a method of raising the channel capacity of the above-mentioned backbone, a business is starting which periodically downloads data using the satellite to each of positions of internet service providers (ISPs). Each ISP stores data received from the satellite in a cache memory thereof to submit it to users.

(4) Practical Use of Communication Resources the other hand, there is the above-mentioned direct satellite broadcasting as the most spread application in the satellite communications. Millions of subscribers in only Japan already use television and radio broadcasting of hundreds of channels. However, most of programs are not broadcast at midnight and then communication resources are idle. Further useful applications develop by practically using the communication resources.

(5) Practical Use of Multimedia Techniques

One key of the business of this invention is to rapidly increase an amount of information provided by using the newest signal processing techniques.

Education is exemplified. A broadcast college carried out presently uses television channels. The television channels are quite insufficient as regular education and available frequency resources are limited. As a result, channel assignments over this are not expected.

However, if contents of lectures are investigated minutely, it is apparent that it is possible to broadcast lectures two or more times by using a current television band. By using a current signal processing technique, it is possible to drastically decrease a required band width due to image compression and speech compression. For instance, it is possible to decrease the required band width up to about 8 Kbps and about 300 Kbps in connection with a speech and a moving image or picture, respectively. As regards the speech of a high quality, it is possible to realize a sound quality as in a compact disc (CD) if the band width is about 128 Kbps. In addition, in a normal lecture, it is not always to require the moving image. Although it is necessary for a lecturer's voice to always hear, a still image is basically sufficient for ones where the lecturer writes on a blackboard. In addition, although a sound having a high quality is essential to music, but the sound having the high quality is not always required. Although the required band width is multifarious due to contents of the lecture, the band width of about 128 Kbps to 256 Kpbs is sufficient on an average for the lecture. Inasmuch as a present television uses the band width of about 5 MHz, it is possible to broadcast, by using the same frequency band, the lectures which are equal in number to twenty to a hundred. If fifty lectures are simultaneously broadcasted on an average, it is possible to broadcast a thousand and two hundreds lectures per day. This perhaps may be an amount which surpasses the greatest school or college on the earth.

(6) Merit in Data Storage

Merits in a current available digital signal processing (DPS) are not only confined to the data compression. Another important merit in the digital signal processing is a merit in information storage. Education programs are successively always broadcasted by using the communication satellite and a subscriber's terminal selectively receives a signal addressed to the subscriber at the appointed time to store it a memory. The subscriber reads stored data at his or her convenience to use it. By using vacant hours of midnight due to the merit in the data storage, it is possible to distribute thousands of lectures per day. Accordingly, it is possible to provide learning programs having higher freedom to the subscribers in a broad range in a grand area.

In general, it is increasingly necessary to store not only data updated day by day such as education but also a lot of data which is not updated such as a library. When a small office home office (SOHO) where a work is done at home spreads hereafter, various technical materials and market information necessitate more and more. Its characteristic is that an amount of data becomes huge and the Internet is disadvantageous in that a communication time and fee become larger due to the above-mentioned reasons. On the other hand, the satellite communications are extremely effective to temporarily distribute a lot of data to a number of persons.

(7) Flexible Time Service

A further characteristic in the satellite communications enables not only communication of a store-type but also communication of an instant-type. This is because data distribution is performed in the ground communication network for the destination via several routers while the data is distributed in the satellite communications to the destination by only one relay. Inasmuch as this corresponds to immediately read the stored data on reception of a request for the stored data, it is possible to realize this by using the stored-type as it is on the signal processing.

(8) Satellite Communications Data Distribution Center Serving as a Temporary Storage Position of the Internet In the manner which is described above, the data connected to the data distribution center is directly efficiently distributed to terminal's users via the communication satellite at a flexible delivery time. Accordingly, the satellite communications are effective if the satellite communications data distribution center uses as the temporary storage position for information of the Internet to periodically distribute the stored data to the subscribers.

(Prior Art)

Figure 1:
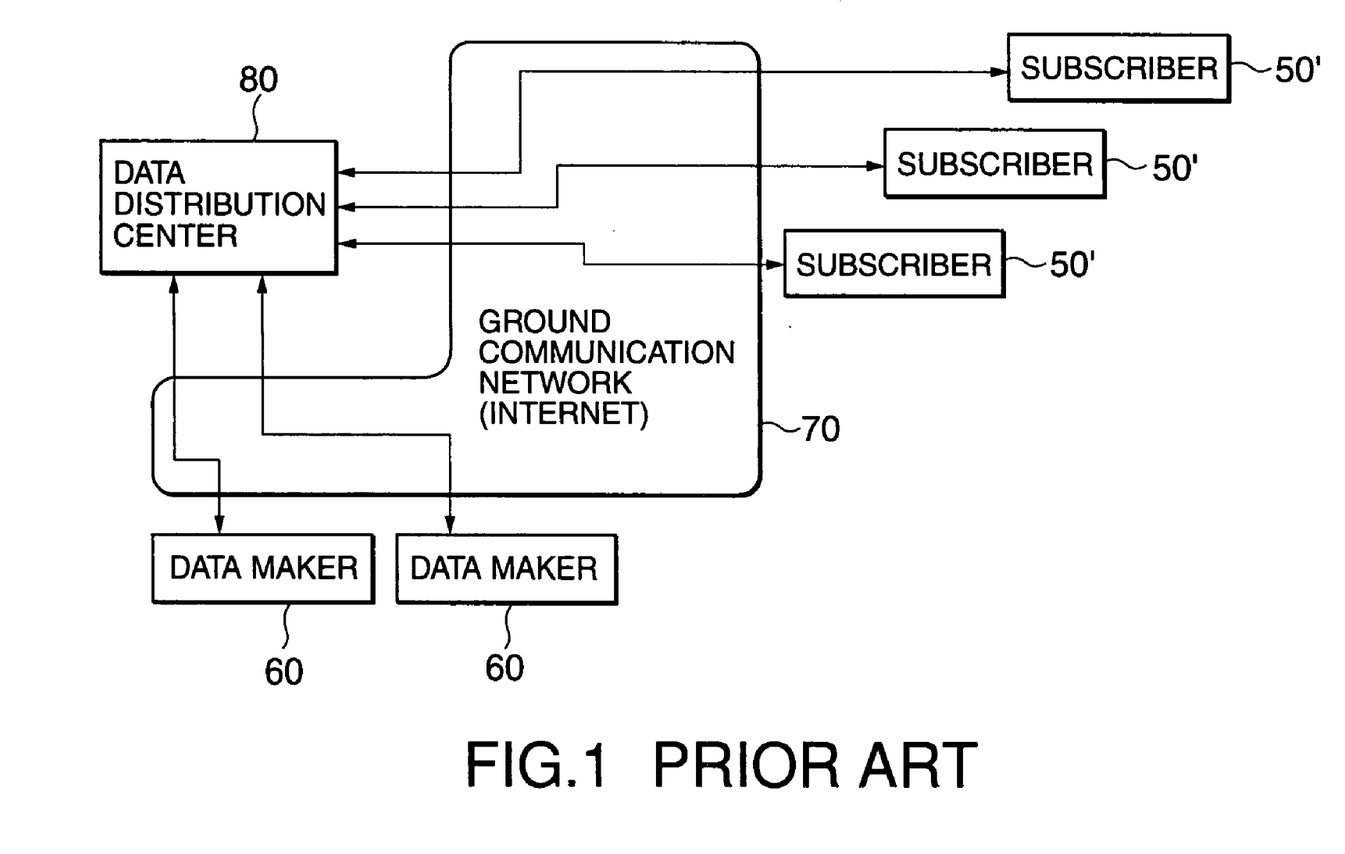
FIG. 1 is a block diagram of a conventional date distribution system using the Internet.

Referring to FIG. 1, a conventional data distribution system using the Internet will be described at first in order to facilitate an understanding of the present invention.

The data distribution system comprises a plurality of members or subscribers 50', a plurality of data makers or senders 60, the Internet 70 serving as a ground communication network connected to the members 50' and the data makers 60, and a data distribution center 80 connected to the Internet 70. The data distribution center 80 provides a home page (HP).

Referring to FIG. 1, description will be made as regards operation of the conventional data distribution system.

Each data maker or data sender 60 prepares information to be sent to publish the information on the home page (which will be hereinafter called "HP" for short) of the data distribution center 80 serving as a position where the Internet provider or enterpriser provides. On the other hand, each member or user 50' connects to the data distribution center 80 via the Internet 70 and reads a predetermined data from the date distribution center 80 to use it. The user 50 inputs questions, opinions, answers for the data sender 60 or the like on the data distribution center 80 via the Internet 70. Responsive to in input from the user 50', the data distribution center 80 replies on the HP or by an electronic mail (E-mail).

In the manner which is described above, the data senders 60 and the users 50' can prepare and use information at his or her convenience. In addition, the user may be connected to the Internet 70 irrespective to a position. In as much as the Internet 70 has a high degree of freedom without any temporal and spatial restriction, it is possible to easily construct an interactive information system due to two-way communication. In addition, the information is not restricted to a letter, it is possible a to use various types of information such as a picture (painting), an image, a voice, or the like. In the manner which is described above, the Internet 70 is a really epoch-making information communication system and abruptly grows up.

However, the conventional data distribution system has disadvantages, as mentioned in the preamble of the instant specification.

(Embodiment)

Figure 2:
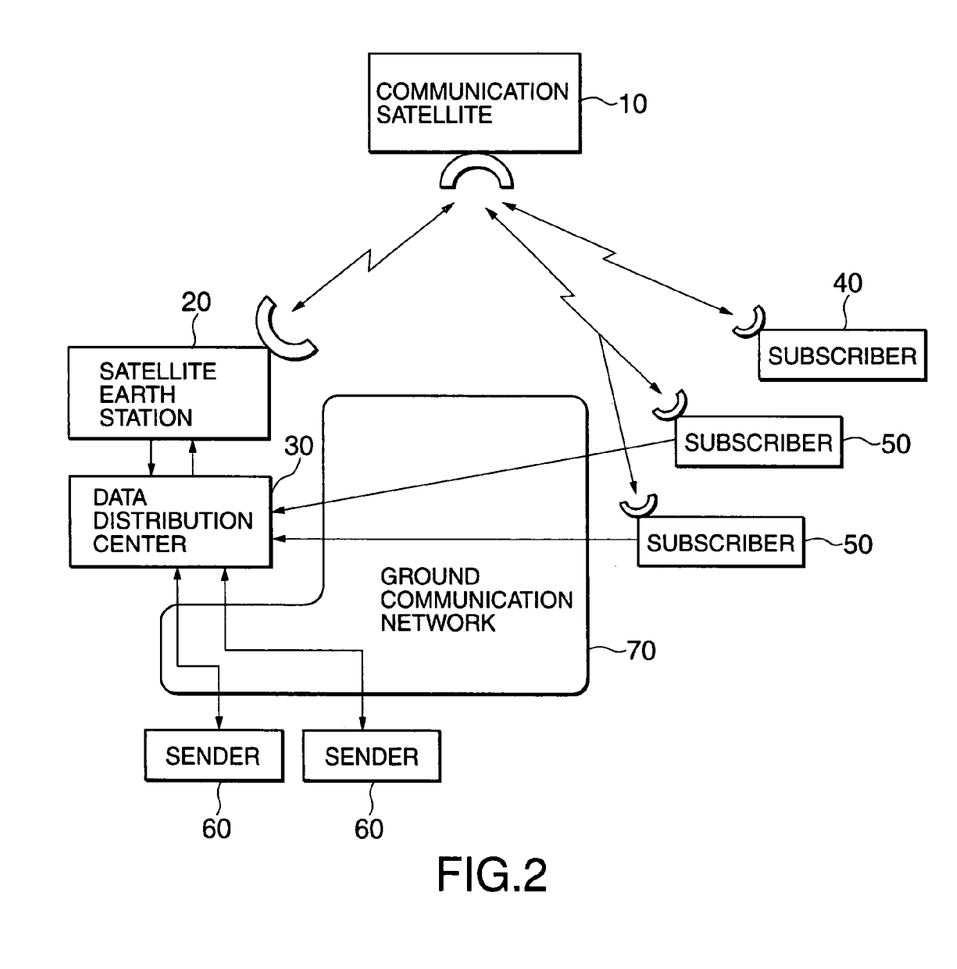
FIG. 2 is a block diagram of a satellite communications data distribution system according to an embodiment of this invention.

Referring to FIG. 2, the description will proceed to a satellite communications data distribution system according to an embodiment of this invention. The illustrated satellite communications data distribution system comprises a communication satellite 10, a satellite earth station 20, and a data distribution center 30. The satellite earth station 20 carries out communication between the communication satellite 10 and the satellite earth station 20. In addition, the satellite earth station 20 is connected to the data distribution center 30. Hereinafter, a combination of the satellite earth station 20 and the data distribution center 30 is called a data center.

The satellite communications data distribution system further comprises a plurality of subscriber's terminals 40 and 50, a plurality of information originators or senders 60, and a ground communication network 70. The subscriber's terminals are classified into first-type subscriber's terminals 40 and second-type subscriber's terminals 50. Each first-type subscriber's terminal 40 is a two-way satellite communicatable subscriber's terminal which can not only receive a signal via the communication satellite 10 but also transmit a signal via the communication satellite 10. On the other hand, each second-type subscriber's terminal 50 is a reception exclusive subscriber's terminal which can receive a signal from the communication satellite 10 but cannot transmit a signal. Each second-type subscriber's terminal 50 is connected to the ground communication network 70. Each information sender 60 may be, for example, an editor for an home page of the Internet or an electronic book publisher. Each information sender 60 is connected to the data distribution center 30 via the ground communication network 70. The ground communication network 70 may be, for example, a communication network for telephones and facsimiles, the Internet, or the like.

In the manner which is illustrated in FIG. 2, the data distribution center 30 carries out satellite communications to all of the subscriber's terminals 40, 50 via the satellite earth station 20 and the communication satellite 10. In addition, the data distribution center 30 has a communication function such as a telephone, a facsimile, a mail-box, an E-mail, or the like to the second-type subscriber's terminal 50 via the ground communication network 70 but also another communication function such as file transfer to the information sender 60 via the ground communication network 70 or satellite communications. The data distribution center 30 is a central component part of the system according to this invention.

Figure 3:
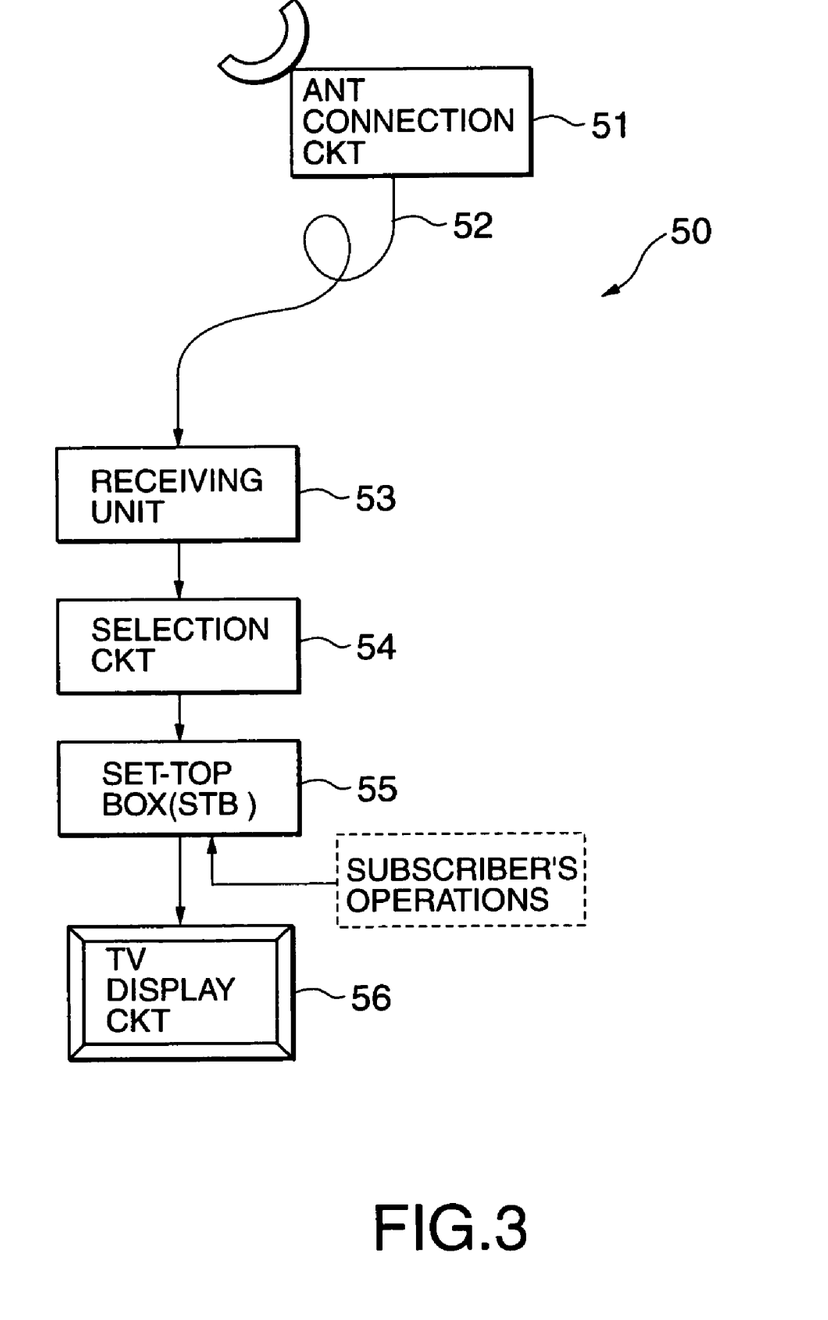
FIG. 3 is a block diagram of a subscriber's terminal according to this invention that may serve also as a satellite broadcast reception equipment.

Turning to FIG. 3, the description will proceed to the second-type subscriber's terminal 50 illustrated in FIG. 2. The second-type subscriber's terminal 50 comprises a satellite communications reception antenna and connection circuit (which will later be called "ANT connection circuit") 51, a connection cable 52, a receiving unit 53, a selection circuit 54, a set-top box (which will later be called "STB") 55, and a television (TV) display circuit 56.

The ANT connection circuit 51 is connected to the receiving unit 53 through the connection cable 52. The receiving unit 53 is connected to the selection circuit 54. The selection circuit 54 is connected to the STB 55. The STB 55 is connected to the TV display circuit 56.

The receiving unit 53 carries out amplification and demodulation on a received signal. The selection circuit 54 selects, as a selected signal, a signal addressed to the subscriber in question from the received signal. The STB 55 stores the selected signal and carries out reproduction of an image and a voice in accordance with an operation of the subscriber. Responsive to a signal from the STB 55, the TV display circuit 56 displays the image and the voice.

An equipment illustrated in FIG. 3 may be implemented by using most of a current commercialized direct satellite broadcast (DSB) equipment as it is. In this event, in general, the ANT connection circuit 54 is set up outdoor while others except for the ANT connection circuit 54 is set up indoor. A combination of the STB 55 and the TV display circuit 56 may be operable as a normal reception display unit for satellite broadcasting by operations of the subscriber and maybe a terminal for a satellite communication educational institution or school with which the system according to this invention provides.

Figure 4:
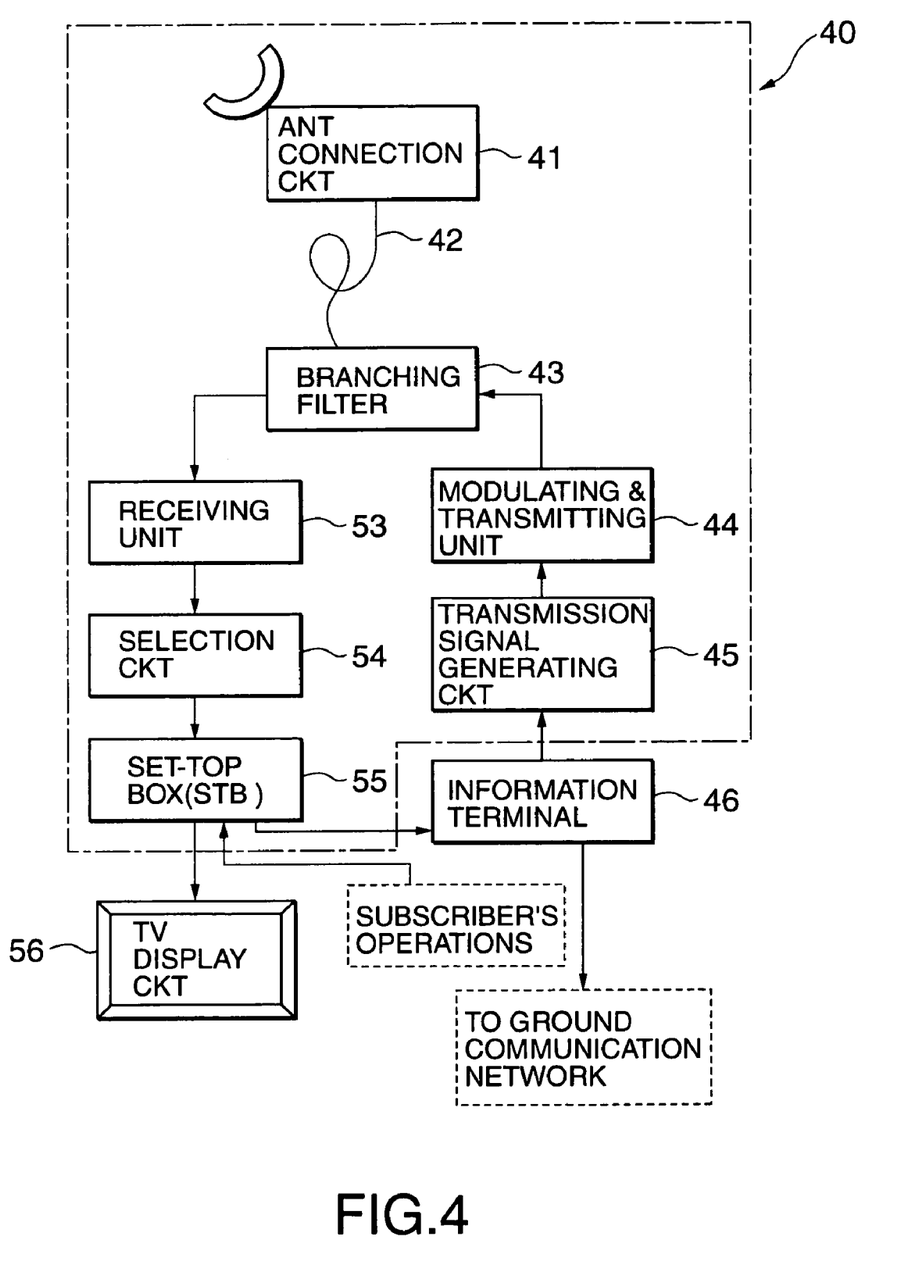
FIG. 4 is a block diagram of, as a subscriber's terminal for use in the system according to this invention, a two-way satellite communication terminal which may serve also as a VSAT terminal.

Turning to FIG. 4, the description will proceed to the first-type subscriber's terminal 40 illustrated in FIG. 2. The first-type subscriber's terminal 40 comprises a satellite communications reception antenna and connection circuit (which will later be called "ANT connection circuit") 41 which enables to not only receive but alto transmit, a connection cable 42, and a branching filter or a channel multiplexer 43 for separating a transmission signal and the received signal. The ANT connection circuit 41 is connected to the branching filter 43 through the connection cable 42.

The first-type subscriber's terminal 40 further comprises an information terminal 46 such as a personal computer (which may be called "PC" for short) or the like, a transmission signal generating circuit 45, and a modulating and transmitting unit 44. The information terminal 46 is connected to the transmission signal generating circuit 45. The transmission signal generating circuit 45 is connected to the modulating and transmitting unit 44.

The information terminal 46 prepares a signal to supply a prepared signal to the transmission signal generating circuit 45. Responsive to the prepared signal, the transmission signal generating circuit 45 generates the transmission signal of a predetermined transmission signal format to supply the transmission signal to the modulating and transmitting unit 44. Responsive to the transmission signal, the modulating and transmitting unit 44 modulates a carrier signal with the transmission signal in a predetermined system to produce a modulated signal, sets a frequency for the modulated signal, and amplitudes a modulated signal into an amplified modulated signal. The amplified modulated signal is sent to the ANT connection circuit 41 through the branching filter 43 and the connection cable 42.

In a similar manner as the second-type subscriber's terminal 50 illustrated in FIG. 3, the first-type subscriber's terminal 40 further comprises the receiving unit 53, the selection circuit 54, the STB 55, and the TV display circuit 56. The STB 55 is connected to the information terminal 46.

In the manner as apparent by comparing FIG. 4 with FIG. 3, the first-type subscriber's terminal 40 comprises a receiving portion which enables to serve the direct satellite broadcast reception equipment and a transmitting portion which enables to serve a terminal equipment for a very small aperture terminal (VSAT) system.

Figure 5:
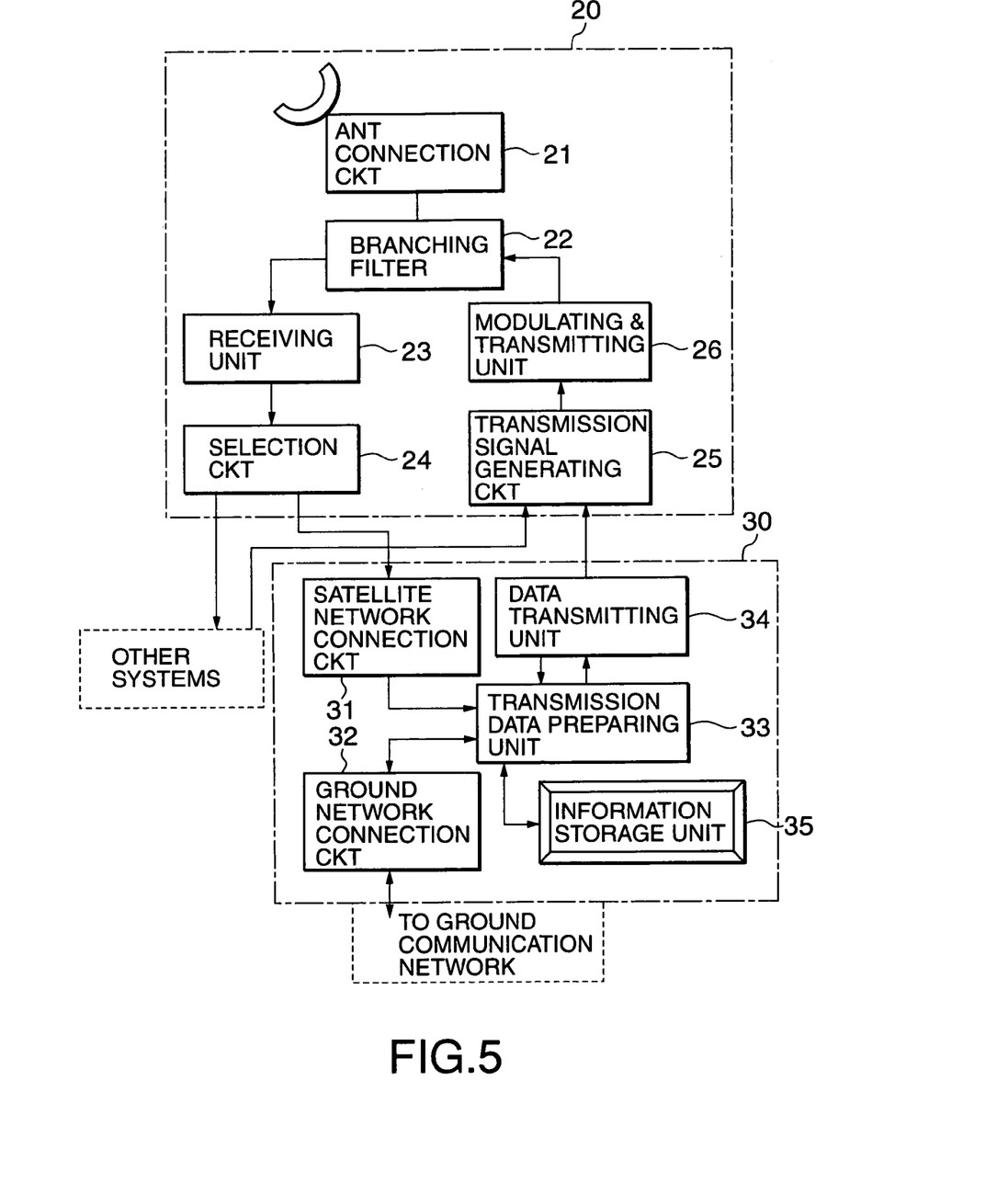
FIG. 5 is a bock diagram of a satellite earth station and a data distribution center which are the key point of the system according to this invention.

Turning to FIG. 5, the description will proceed to the data center (20, 30) which plays a central function in this invention. The satellite earth station 20 comprises an antenna and connection circuit (which will later be called "ANT connection circuit") 21, a branching filter or a channel multiplexer 22, a receiving unit 23, a selection circuit 24, a transmission signal generating circuit 25, and a modulating and transmitting unit 26. The ANT connection circuit 21 is connected to the branching filter 22. The branching filter 22 is connected to the receiving unit 23 and to the modulating and transmitting unit 26. The receiving unit 23 is connected to the selection circuit 24. The modulating and transmitting unit 26 is connected to the transmission signal generating circuit 25.

On the other hand, the data distribution center 30 comprises a satellite network connection circuit 31 for receiving a signal from the satellite earth station 20, a ground network connection circuit 32 for carrying out a transmission and reception connection to the ground communication network 70 (FIG. 2) for telephones, facsimiles, file transfers, and E-mails, a transmission data preparing unit 33, a data transmitting unit 34, and a information storage unit 35. The satellite network connection circuit 31 is connected to the selection circuit 24 and to the transmission data preparing unit 33. The ground network connection circuit 32 is connected to the transmission data preparing unit 33 and to the ground communication network 70 (FIG. 2). The data transmitting unit 34 is connected to the transmission signal generating circuit 25 and to the transmission data preparing unit 33. The information storage unit 35 is connected to the transmission data preparing unit 33.

Responsive to a data request signal received from the subscriber via the satellite network connection circuit 31 or the ground network connection circuit 32, the transmission data preparing unit 33 prepares a series of data to be transmitted to the communication satellite 10 (FIG. 2). The data transmitting unit 34 reads, in accordance with a satellite system time, transmission data from the transmission data preparing unit 33, generates the transmission data in a broadcasting fashion, and sends the transmission data to the satellite earth station 20. The information storage unit 35 is a unit for storing a lot of information in a form of a compact disc (CD), a hard dick (HD), a magnetic tape, a redundant array of inexpensive disks (RAID), and so on. The information storage unit 35 may be an electronic library. The electronic library 35 may exchange and collect information to and from the subscribers via the satellite network connection circuit 31 or the ground network connection circuit 32 or general users via the Internet and may store the information therein.

The satellite communications data distribution system according to this invention can resolve the problems in the above-mentioned conventional data distribution system using the Internet (FIG. 1).

More specifically, the satellite communications data distribution system according to this invention has a good efficiency because the satellite communications data distribution system according to this invention distributes the data using the broadcasting of the satellite. Inasmuch as each of the subscriber's terminals 40, 50 maybe used also as the direct satellite broadcasting reception terminal, each subscriber's terminal is not expensive. Particularly, if the data distribution is carried out at midnight when a number of broadcasting channels stop to transmit, the communication fee is not expensive. The rent of a satellite channel having a bit rate of about 10 Mb/s is about twenty thousands yen per hour. It takes about ten seconds to distribute the above-mentioned teaching material having a data capacity of 10 MBytes using this channel. Cost required to this is not more than one hundred yen and then cost per person becomes not more than one yen if the subscriber's receiving a subject for the teaching material are equal in number to one hundred. Inasmuch as the number of subjects enable to distribute for one hour are not less than three hundreds, it is possible to distribute the teaching materials of thousands of special subjects by using time band of the midnight. In comparison with the current broadcast collage, it is possible to increase the number of the special subjects by hundreds of times.

In the manner as apparent from the above description, the data distribution using the satellite communications has a higher efficiency when the number of the users simultaneously receiving the data is many. Although a satellite Internet system which immediately replies to a user's request is practically used, such a satellite Internet system is expensive compared with the Internet in an especial case of carrying out distribution of a lot of data for one user.

However, utilization mode in the user is really multifarious. In the information storage unit 35, various types are stored that are, for example, those which may be reached within several days after an order such as the complete works of Japanese literary or a textbook of algebraic geometry, those which may be updated once a day such as a daily newspaper, those which may be updated once several hours such as a weather forecast, and those in which instant response may be required such as a reservation condition of a means of transportation.

Figure 6:
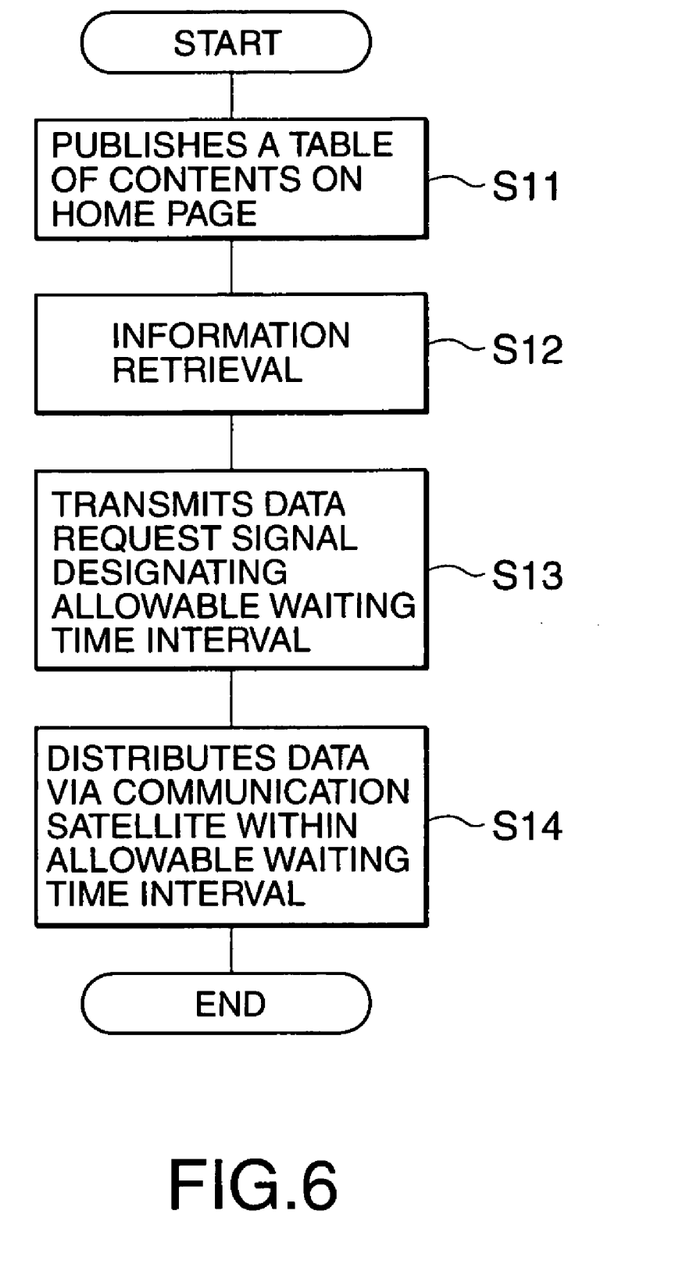
FIG. 6 is a flow chart for use in describing a data distribution method according to this invention.
Figure 7:
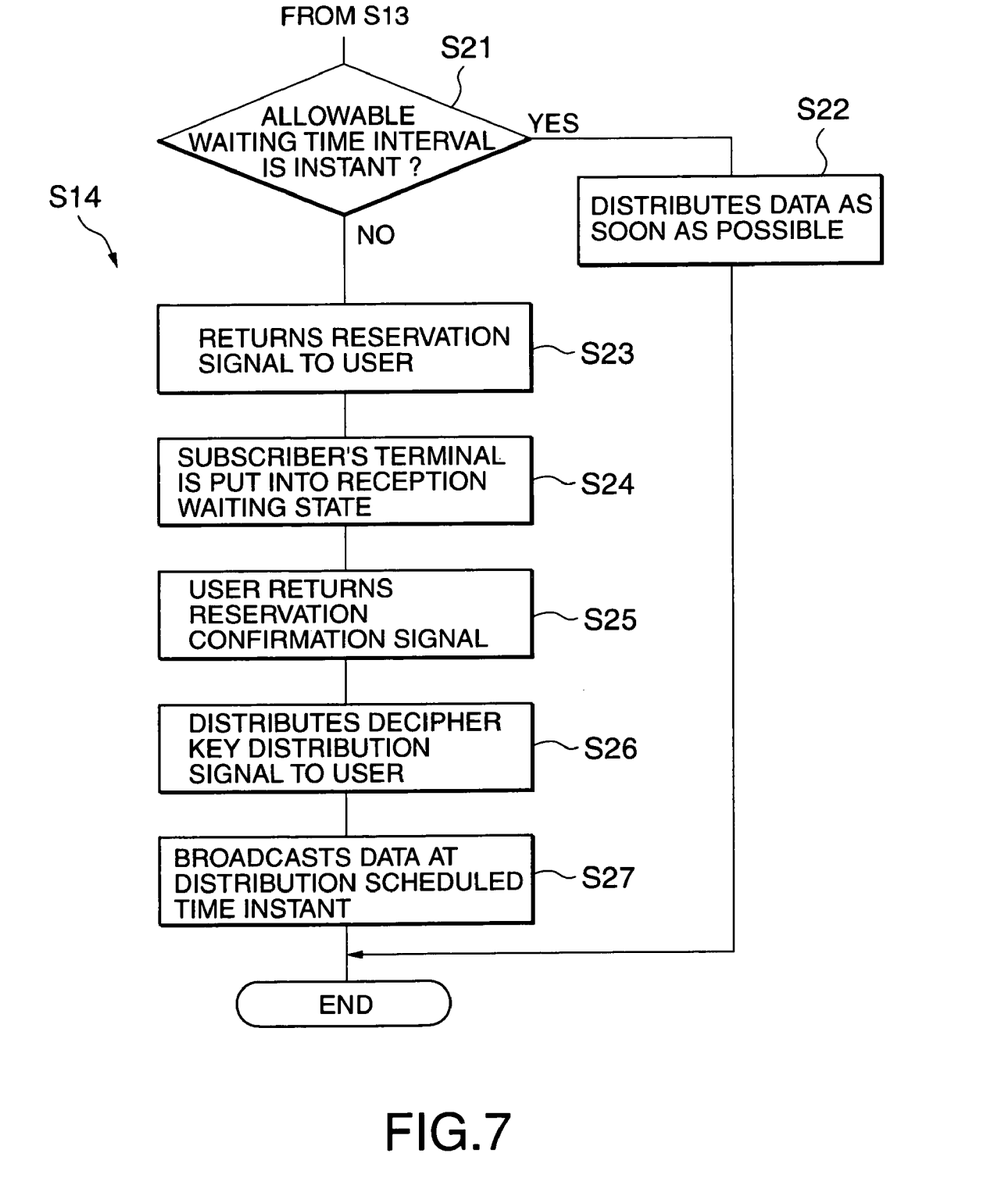
FIG. 7 is a flow chart for use in describing a data distribution step in FIG. 6 in more detail.
Figure 8:
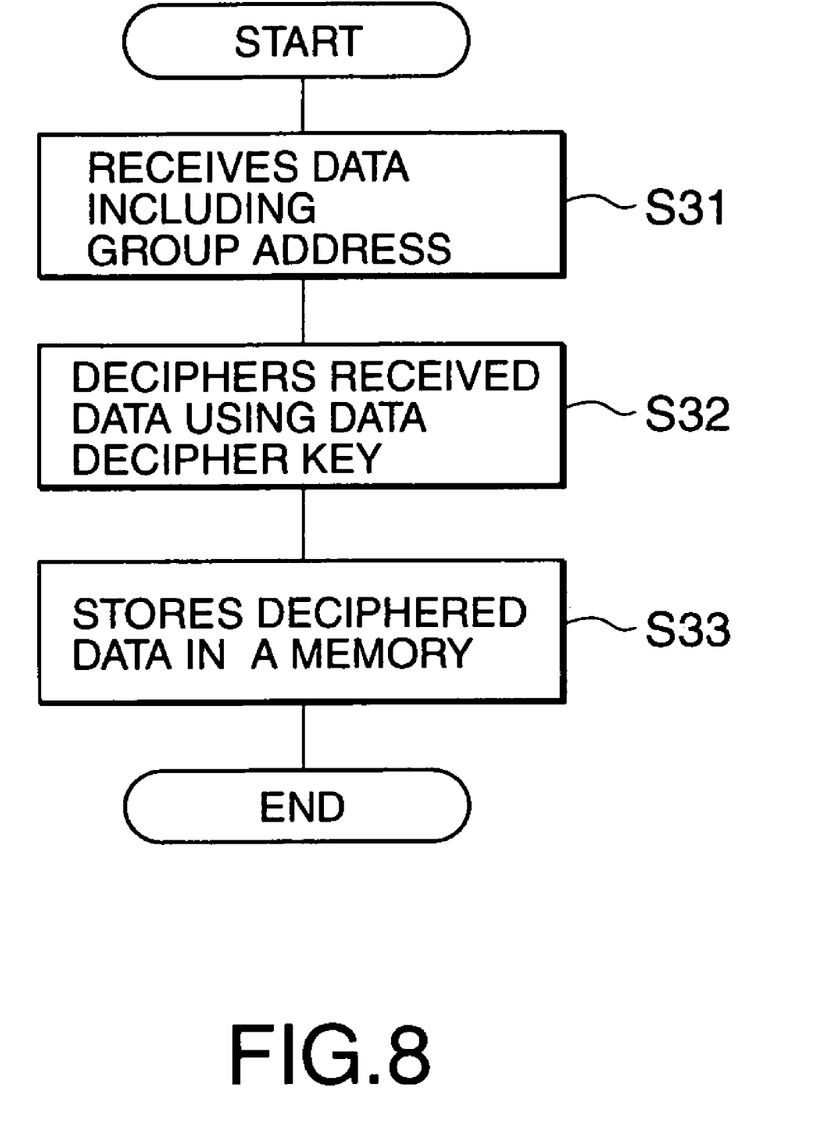
FIG. 8 is a flow chart for use in describing a reception operation in each subscriber's terminal in the satellite communications data distribution system illustrated in FIG. 2.
Figure 9:
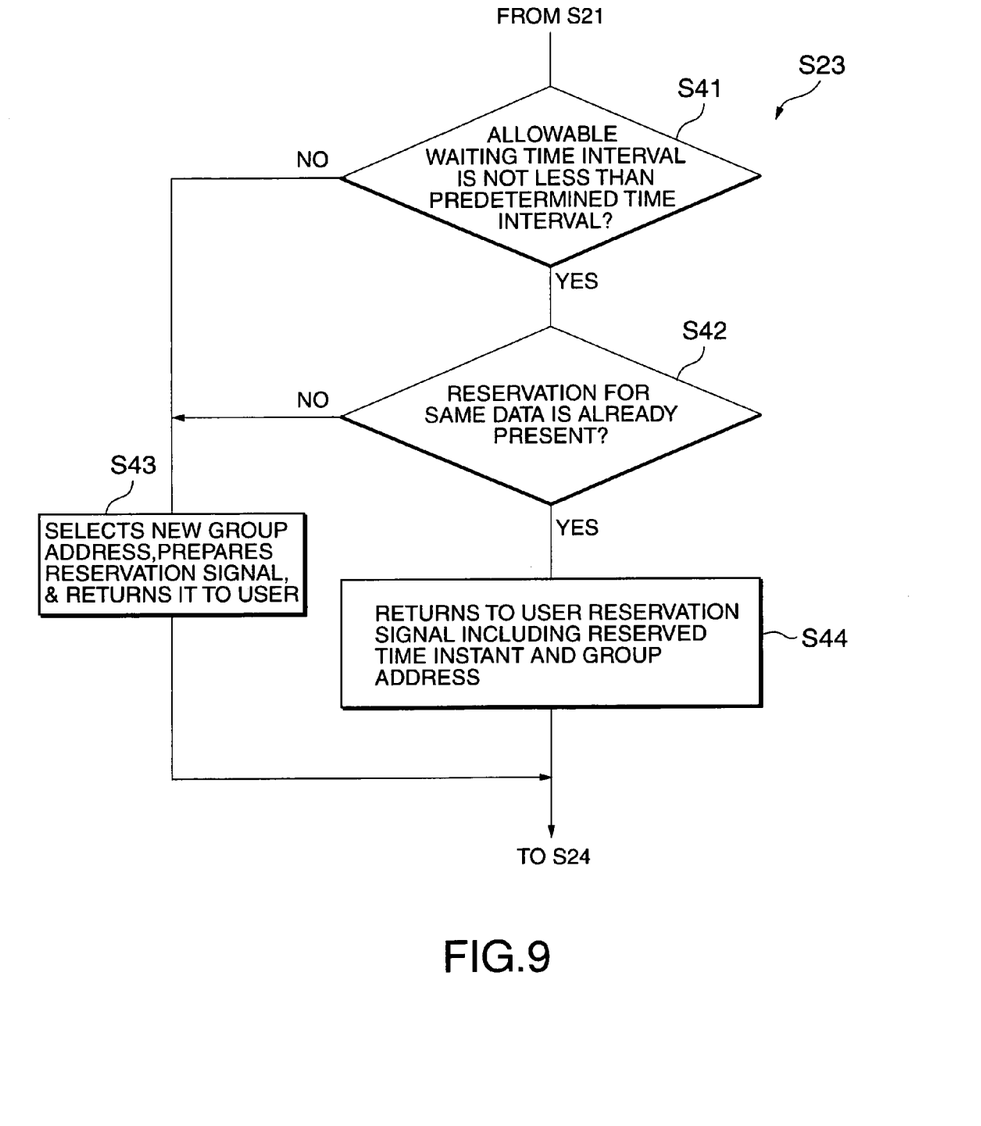
FIG. 9 is a flow chart for use in describing a step for returning a reservation signal in FIG. 7 in more detail.

Therefore, the data distribution system according to this invention responds to various requests of users in a following method as illustrated in FIGS. 6 through 9. Its operation is as follows. In addition, it is noted that each user carries out processing in the manner which will presently be described because there are a lot of users. FIG. 6 is a flow chart for use in describing a data distribution method according to this invention. FIG. 7 is a flow chart for use in describing a data distribution step in FIG. 6 in more detail. FIG. 8 is a flow chart for use in describing a reception operation in each subscriber's terminal in the satellite communications data distribution system illustrated in FIG. 2. FIG. 9 is a flow chart for use in describing a step for returning a reservation signal in FIG. 7 in more detail.

As shown in FIG. 6, the information storage unit or the electronic library 35 stores various information such as books of electronic format, reports of electronic format, a bulletin board system (BBS), or the like and publishes a list of those contents or a table of contents on the home page of the data distribution center 30 at a step S11.

The step S11 is followed by a step S12 at which each user connects with the home page of the data distribution center 30 to retrieve available information. If necessary information exists on the home page, the step S12 proceeds to a step S13 at which the user transmits, to the data distribution center 30, a data request signal with a time limit that will later be described. For example, the user clicks a predetermined position on a screen of the home page.

At the step S13, the data request signal with the time limit is assigned with an allowable waiting time interval until its information is delivered with ID of a requester. The data request signal with the time limit has classes such as instant, within ten minutes, within thirty minutes, within one hour, within six hours, within one day, within three days, periodically, or the like. In a case where the data request signal requests the instant, the requester makes the data request signal include an encipher key.

When the data request signal with the time limit is received in the data distribution center 30, the step S13 is succeeded by a step S14 at which the data distribution center 30 distributes data via the satellite earth station 20 and the communication satellite 10 within the allowable waiting time interval in the manner which will presently be described.

Turning to FIG. 7, the data distribution center 30 determines whether or not the data request signal indicates the instant at a step S21. When the data request signal indicates the instant, the step S21 is followed by a step S22 at which the data distribution center 30 distributes requested data via the communication satellite 10 as soon as possible. In this event, the request data is enciphered using the encipher key designated by the request source.

When the allowable waiting time interval included in the data request signal is not the instant, the step S21 proceeds to a step S23 at which the data distribution center 30 first returns a reservation signal to the request source via the communication satellite 10. Contents of the reservation signal include a request source's ID, a reservation number (a group address), and a distribution scheduled time instant.

When the subscriber's terminals 40, 50 receive the reservation signal, the step S23 is succeeded by a step S24 at which each subscriber's terminal sets the group address and the distribution scheduled time instant which are assigned with its own satellite reception equipment and is put into a reception waiting state. Simultaneously, the subscriber's terminals 40, 50 return a reservation confirmation signal to the data distribution center 30 via the Internet 70 or the communication satellite 10 at a step S25. The reservation confirmation signal includes the request source's ID, an assigned group address, and a request source's encipher key.

When the reservation confirmation signal is received in the data distribution center 30, the step S25 is followed by a step S26 at which the data distribution center 30 distributes, to the request sources or the users, a decipher key distribution signal indicative of a decipher key for distribution data. The decipher key distribution signal is distributed via the ground communication network 70 or the communication satellite 10 in accordance with the reservation confirmation signal. The decipher key distribution signal includes the request source's ID, the group address, and a data decipher key. The decipher key is enciphered by the requester's encipher key designated in the reservation confirmation signal by the requester. By sending this signal, a transaction is effected. When a current time instant reaches to the distribution scheduled time instant, the data distribution center 30 broadcasts data with the above-mentioned group address via the communication satellite 10 at a step S27.

Referring now to FIG. 8, description will be made as regards the reception operation in each of the subscriber's terminals 40 and 50. In the manner which is described above, the data with the above-mentioned is broadcasted from the data distribution center 30 via the communication satellite 10 at the distribution scheduled time instant. Each of the subscriber's terminals 40 and 50 receives the data including the group address assigned with its own station at a designated time instant at a step S31. The step S31 is followed by a step S32 at which each of the subscriber's terminals 40 and 50 deciphers the received data using the data decipher key to produce deciphered data. The step S32 proceeds to a step S33 at which each of the subscriber's terminals 40 and 50 stores the deciphered data in a memory (not shown).

The data distribution center 30 confirms in a monitoring satellite reception equipment (not shown) established therein that the data is rightly received and gives a receipt for the user. When payment is made, the transaction comes to an end.

A key according to this invention is a method of determining the above-mentioned distribution time instant. This determining method is performed by the transmission data preparing unit 33 illustrated in FIG. 5.

Referring now to FIG. 9 in addition to FIG. 7, the description will proceed to a basic way regarding the determining method.

When the data request signal indicates the instant, the data distribution center 30 distributes data as soon as possible (the step S22 in FIG. 7). When the data request signal does not indicate the instant, the step S21 is followed by a step S41 at which the transmission data preparing unit 33 distributes determines whether or not the allowable waiting time interval or a requested emergency level is not less than a predetermined time interval T. When the requested emergency level is not less than the predetermined time interval T, the step S41 proceeds to a step S42 at which the transmission data preparing unit 33 checks whether or not reservation for the same data is already present. When the reservation is absent, the step S42 is succeeded by a step S43 at which the transmission data preparing unit 33 reserves distribution for this data, selects a new group address, prepares a reservation signal in the manner which is described above, and returns the reservation signal to the requester via the communication satellite 10. When the reservation is already present, the step S42 is followed by a step S44 at which the transmission data preparing unit 33 returns the reservation signal including the reserved time instant and the group address in the manner which is described above. Thereinafter, operation is similar to the above-description.

In the first-type subscriber's terminal 40, a portion enclosed with a dot-dash-line maybe implemented by an integrated structure. Although a geostationary satellite system having two hundreds or more spot beams appears, it is possible for such a system to carry out a high-speed communication having a data rate of several Mb/s using a portable satellite communication terminal having a size which is similar to that of a laptop personal computer. As described above, this invention can use not only the existing satellite broadcasting reception equipment, the VSAT, or the like but also can be implemented by a portable terminal with improvement of future technology.

As apparent from the above description, this invention is effective as follows.

A first effect is that it is possible to distribute a large quantity of data to a lot of users in a broad area in very simple structure at a low cost. This is because it is possible for the system according to this invention to use together with the existing direct satellite broadcasting reception equipment, it is therefore possible to easily implement the subscriber's terminal at a low cost, and it is possible to carry out data transfer once a number of persons in a reservation fashion. In addition, it is possible to directly carry out data distribution to users by only one relay via the satellite and the system according to this invention has a high transmission efficiency because it is unnecessary to divide the data into a lot of datagrams in the manner as the Internet.

A second effect is that it is possible to socially cause a large improvement. By development of communication networks, it will be expected that a small office and home office (SOHO), which can work at home, becomes an influential form of service. For this purpose, it is essential to enable at a house of each user to use a lot of technical materials and tools such as computer aided design (CAD), computer aided manufacturing (CAM), and so on. That is, a mechanism where a lot of information beyond comparison than the present time is available at home is essential. As described above, it is difficult in the Internet to distribute such a lot of data to a number of peoples. However, according to the system of this invention, it is possible to more effectively comply with this request. If the SOHO popularizes, a form of service changes and it is expected that effects produced in industry, life, and society are very large.

While this invention has thus far been described in conjunction with a preferred embodiment thereof, it will now be readily possible for those skilled in the art to put this invention into various other manners. For example,

What is claimed is:

1. A method of distributing data in accordance with requests from a plurality of users, said meted comprising:

storing information in an electronic form to publish a list of its contents on a home page of a data distribution center;

connecting each of said users with the home page of said data distribution center to retrieve available information;

transmitting, from said users, a data request signal to said data distribution center if there is information desired on the basis of a result of retrieval, said data request signal designating an allowable waiting time interval until data is distributed; and     distributing, from said data distribution center, data requested by said data request signal, to said plurality of users via a communication satellite within said allowable waiting time interval designated by said data request signal.

2. The method as claimed in claimed 1, wherein when said allowable waiting time interval designated by said data request signal is instant, said distributing step comprises distributing, from said data distribution center, data requested by said data request signal via said communication satellite as soon as possible.

3. The method as claimed in claimed 1, wherein when said allowable waiting time interval designated by said data request signal is not instant, said distributing comprises:

returning, from said data distribution center, a reservation signal to subscriber's terminals for said users via said communication satellite, said reservation signal including a request source's ID, a group address, and a distribution scheduled time instant;

setting up, in said subscriber's terminals receiving said reservation signal, the group address and the distribution scheduled time instant assigned to its own satellite reception equipment to put said subscriber's terminals receiving said reservation signal into a reception waiting state;

returning, from said users, a reservation confirmation signal to said data distribution center;

distributing, from said data distribution center receiving said reservation confirmation signal, a decipher key distribution signal to said users, said decipher key distribution signal including the request source's ID, the group address, and a data decipher key; and broadcasting, from said data distribution center, data with said group address via said communication satellite at said distribution scheduled time instant.

4. The method as claimed in claimed 3, further comprising:

receiving, in each of said subscriber's terminals, data including the group address assigned to its own station as received data at a time instant designated;

deciphering, in each of said subscriber's terminals, said received data using said data decipher key to produce deciphered data; and storing, in each of said subscriber's terminals, said deciphered data in a memory thereof.

5. The method as claimed in claimed 4, wherein returning said reservation signal comprises:

when said allowable waiting time interval designated by said data request signal is within a predetermined time interval, checking, in said data distribution center, whether or not a reservation for the same data is already present;

when said reservation is absent, reserving, in said data distribution center, distribution for said data in question after said predetermined time interval is elapsed, and preparing said reservation signal by selecting a new group address to return said reservation signal to said users via said communication satellite; and when said reservation is already present, returning, from said data distribution center, said reservation signal including its scheduled time instant and the group address to said users via said communication satellite.

6. The method of claim 1, wherein, when said allowable waiting time interval is not instant, said distributing comprises:

returning a reservation signal from said data distribution center to said subscriber's terminals for said users via said communication satellite, wherein said reservation signal includes a request source's ID, a group address, and a distribution scheduled time instant.

7. The method of claim 6, wherein said distributing further comprises:

setting up the group address and the distribution scheduled time instant assigned to the satellite reception equipment of said subscriber's terminals receiving said reservation signal to put said subscriber's terminals receiving said reservation signal into a reception waiting state.

8. The method of claim 6, wherein said distributing further comprises:

returning a reservation confirmation signal from said users to said data distribution center.

9. The method of claim 8, wherein said distributing further comprises:

distributing a decipher key distribution signal from said data distribution center receiving said reservation confirmation signal to said users.

10. The method of claim 9, wherein said decipher key distribution signal comprises the request source's ID, the group address, and a data decipher key.

11. The method of claim 6, wherein said distributing further comprises:

broadcasting data with said group address from said data distribution center via said communication satellite at said distribution scheduled time instant.

12. The method of claim 1, wherein said data request signal comprises, as said allowable waiting time interval, one of instant, within ten minutes, within thirty minutes, within one hour, within six hours, within one day, within one week, and a periodic distribution.

13. A data distribution system comprising:

a communication satellite;

a plurality of satellite communication terminals enabled to receive a signal from said communication satellite;

a satellite earth station for carrying out a principal communication via said communication satellite;

a data distribution center connected to said satellite earth station by a communication channel; and a data communication network for connecting said data distribution center and a database for information collection, wherein:

said data distribution center comprises an electronic library for storing collected information in an electronic from, said electronic library presenting stored contents to users of said satellite communication terminals to submit retrieval of said users, said electronic library supplying information requested in accordance with a data request signal from said users, each satellite communication terminal comprises means for transmitting a data request signal with a time limit to said data distribution center, and said data distribution center further comprises means for distributing, in response to the data request signal from each satellite communication terminal, desired data to said satellite communication terminals via said satellite earth station and said communication satellite within the time limit designated.

14. The data distribution system as claimed in claim 13, further comprising a ground communication network for connecting said data distribution center with each satellite communication terminal.

15. The data distribution system as claimed in claim 13, wherein said data communication network comprises the Internet.

16. The system of claim 13, wherein said data request signal comprises, as said designated time limit, one of instant, within ten minutes, within thirty minutes, within one hour, within six hours, within one day, within one week, and a periodic distribution.

17. A data distribution method in a data distribution system comprising:

a communication satellite;

a plurality of satellite communication terminals enabled to receive a signal from said communication satellite;

a satellite earth station for carrying out a principal communication via said communication satellite;

a data distribution center for connecting said satellite earth station by a communication channel; and a data communication network 'for connecting said data distribution center and a database for information collection, wherein said data distribution center comprises an electronic library storing collected information in an electronic form, said electronic library presenting stored contents to users of said satellite communication terminals, said electronic library supplying information requested in accordance with a data request signal from said users, said data distribution method comprising:

transmitting, from each satellite communication terminal, a data request signal with a time limit to said data distribution center; and distributing, from said data distribution center, in response to the data request signal from each satellite communication terminal, desired data to the plurality of satellite communication terminals via said satellite earth station and said communication satellite within the time limit designated.

18. The method of claim 17, wherein said data request signal comprises, as said designated time limit, one of instant, within ten minutes, within thirty minutes, within one hour, within six hours, within one day, within one week, and a periodic distribution.

* * * * *